United States Patent
Teague et al.

(10) Patent No.: US 7,453,849 B2
(45) Date of Patent: Nov. 18, 2008

(54) METHOD OF IMPLICIT DEASSIGNMENT OF RESOURCES

(75) Inventors: Edward Harrison Teague, San Diego, CA (US); Avneesh Agrawal, San Diego, CA (US); David Jonathan Julian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 440 days.

(21) Appl. No.: 11/022,507

(22) Filed: Dec. 22, 2004

(65) Prior Publication Data

US 2006/0133312 A1 Jun. 22, 2006

(51) Int. Cl.
*H04Q 7/00* (2006.01)

(52) U.S. Cl. .................. 370/329; 370/348; 370/347; 455/434; 455/450; 455/451; 455/452.1; 455/453

(58) Field of Classification Search .......... 320/329; 455/434, 450, 451, 452.1, 452.2, 453, 449, 455/442
See application file for complete search history.

(56) References Cited

U.S. PATENT DOCUMENTS

| | | | |
|---|---|---|---|
| 6,188,717 B1 | 2/2001 | Kaiser et al. | |
| 6,532,227 B1 | 3/2003 | Leppisaari et al. | 370/348 |
| 6,597,680 B1 | 7/2003 | Lindskog et al. | 370/347 |
| 6,724,813 B1 | 4/2004 | Jamal et al. | 375/219 |
| 6,801,564 B2 | 10/2004 | Rouphael et al. | |
| 6,813,478 B2 | 11/2004 | Glazko et al. | |
| 6,878,694 B2 | 4/2005 | Komatsu | |
| 6,888,805 B2 | 5/2005 | Bender et al. | |
| 6,907,246 B2 * | 6/2005 | Xu et al. | 455/447 |
| 7,099,299 B2 | 8/2006 | Liang et al. | |
| 7,133,460 B2 | 11/2006 | Bae et al. | |
| 2002/0080902 A1 | 6/2002 | Kim et al. | |
| 2004/0095903 A1 * | 5/2004 | Ryan et al. | 370/329 |
| 2004/0114552 A1 | 6/2004 | Lim et al. | |
| 2004/0136445 A1 | 7/2004 | Olson et al. | |
| 2004/0235472 A1 * | 11/2004 | Fujishima et al. | 455/434 |
| 2005/0202784 A1 * | 9/2005 | Xu et al. | 455/63.3 |
| 2005/0272432 A1 * | 12/2005 | Ji et al. | 455/449 |

FOREIGN PATENT DOCUMENTS

WO WO 02/37887 A1 * 5/2002
WO WO 2006/022876 A1 3/2006

OTHER PUBLICATIONS

International Search Report-International Search Authority-European Patent Office PCT/US05/046806, Feb. 5, 2006.

* cited by examiner

*Primary Examiner*—David Q Nguyen
(74) *Attorney, Agent, or Firm*—Milan I. Patel; Donald C. Kordich; Thomas R. Rouse

(57) ABSTRACT

Accordingly, a method and apparatus are provided that use implicit de-assignment, instead of explicit deassignment, of resources, such that a mobile terminal can interpret the assignment of the resources to other channel terminals as an implied deassignment of the resources. Thus, reducing the number of assignment or the assignment between the base station and the terminals.

25 Claims, 4 Drawing Sheets

US 7,453,849 B2

METHOD OF IMPLICIT DEASSIGNMENT OF RESOURCES

REFERENCE TO CO-PENDING APPLICATIONS FOR PATENT

This application is related to the following co-pending U.S. patent applications: U.S. application Ser. No. 10/340,507, filed on Jan. 10, 2003 and U.S. application Ser. No. 10/726,944, filed Dec. 3, 2003, both assigned to the assignee hereof, and expressly incorporated herein by reference.

FIELD OF INVENTION

The present invention relates generally to communication and more specifically to techniques for deassigning communication resources.

BACKGROUND

Wireless communication systems are widely deployed to provide various types of communication such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, and orthogonal frequency division multiple access (OFDMA) systems. Typically, a wireless communication system comprises several base stations (also referred to as access point), wherein each base station communicates with the mobile station using a forward link and each mobile station communicates with base station using a reverse link.

Multiple access communication systems often employ a method of assigning specific channel resources for use by one or more terminals or access terminals (ATs). The resource may be a time slot, spreading code, frequency band, etc. Both forward and reverse link traffic channels may be assigned to terminals by messages transmitted to the terminals via a shared or broadcast control channel. Further, traffic channels may also be explicitly deassigned by transmitting deassignment messages to terminals when the network needs to use the resource for another user, or purpose. Alternatively, traffic channels assignments may be explicitly deassigned after each use of the channel (after each packet transmission). Often, the resources required by this control channel are high, and limitations on the control channel limit the ability of the network to effectively manage the assignment of traffic channels and to maximize the efficiency of the network.

In a typical communications system, such as OFDMA, the certain resources are typically allocated to users on a temporary basis. The base station provides indication to the users (one or more access terminals in communication with the base station) have explicit assignment and also provide an indication to the users of explicit de-assignment. Typically, a base station transmits an assignment that is deassigned automatically after packet transmission/reception. This removes the deassignment message requirement, but would require an assignment for each channel use, even if the user needs a "continuous" assignment, or "semi-continuous" assignment. This requires several exchanges between the user and the base station. Generally, the base station transmits a deassignment message requesting the user to discontinue the use of resources. Upon receiving and acknowledgment message, the base station allocates those resources to a new user by transmitting and assignment message. Deassignments are important to prevent collisions of traffic and/or feedback channels, which can severely limit network performance. However, transmitting de-assignments and assignments increases assignment traffic and lower efficiency in the system. In a system that uses a channel for providing assignments to all users in the system, it is important that the traffic on this channel be monitored efficiently. Thus, using implicit assignments that allows the network to avoid sending redundant information would be preferred.

Therefore, a method is needed to reduce the number of assignment traffic between the base station and the user.

BRIEF SUMMARY OF THE INVENTION

Accordingly, a method and apparatus are provided that use implicit de-assignment, instead of explicit deassignment, of resources, such that a mobile terminal can interpret the assignment of the resources to other channel terminals as an implied deassignment of the resources. Thus, reducing the number of assignment or the assignment between the base station and the terminals.

In an aspect, and first terminal processes an assignment and determines if the assignment is for another terminal. If so, the first terminal considers this event as a conflict in assignments. In response to the identified conflict in assignment, the first terminal considers this assignment of resources to another as deassignment/de-allocation of resources and may further determine if all the resources are deassigned/deallocated. If determined that only a portion of resources are assigned to another terminal (e.g. deassigned for first terminal), then the first terminal terminates use of those resources that are assigned to the other terminal.

A more complete appreciation of all the advantages and scope of the invention can be obtained from the accompanying drawings, the description and the appended claims.

BRIEF DESCRIPTION OF THE DRAWINGS

The features, nature, and advantages of the present invention will become more apparent from the detailed description set forth below when taken in conjunction with the drawings in which like reference characters identify correspondingly throughout and wherein.

DETAILED DESCRIPTION

The word "exemplary" is used herein to mean "serving as an example, instance, or illustration." Any embodiment or design described herein as "exemplary" is not necessarily to be construed as preferred or advantageous over other embodiments or designs. The word "listening" is used herein to mean that a terminal is receiving and processing data received on a given channel.

Figure 1:
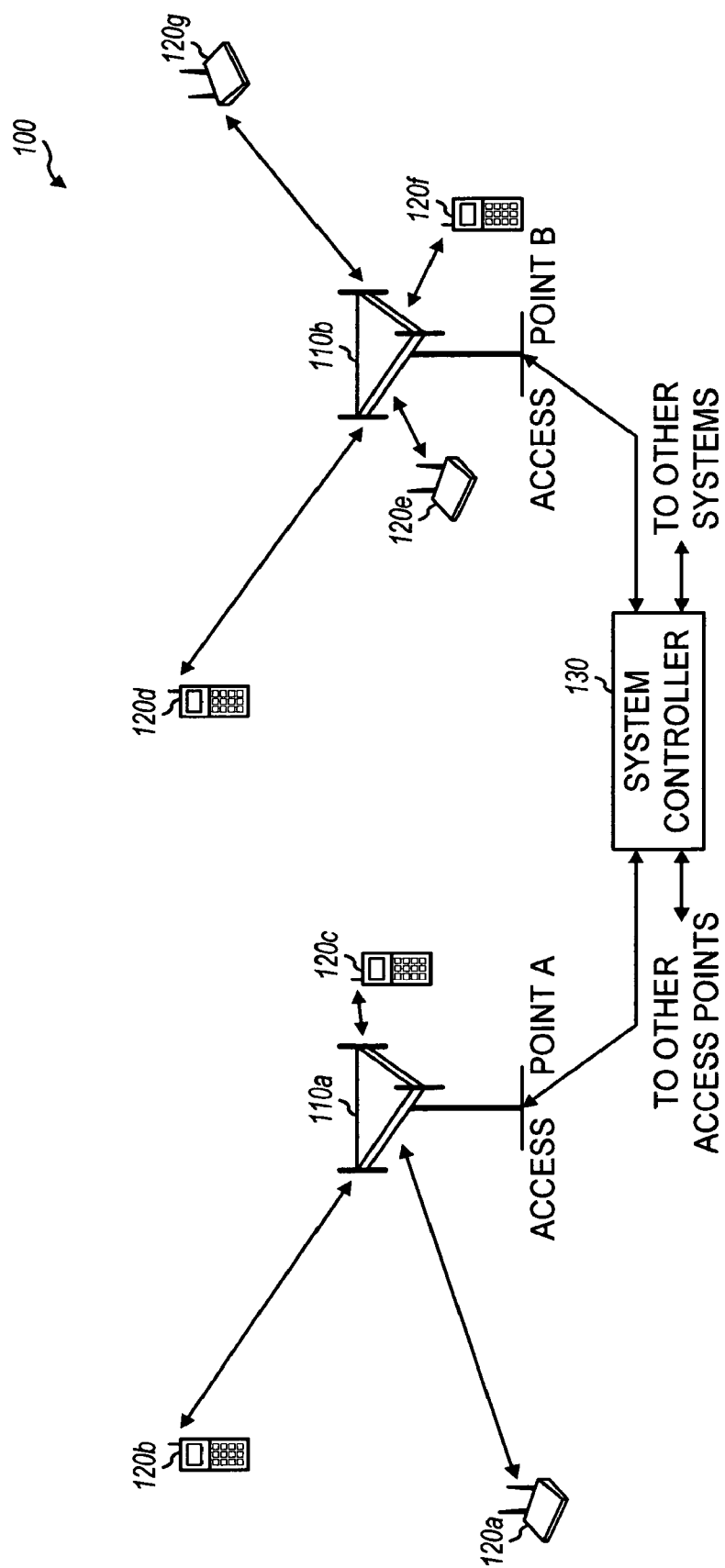
FIG. 1 shows a diagram of a wireless multiple-access communication system.

FIG. 1 shows a diagram of a wireless multiple-access communication system 100 that employs multi-carrier modulation. System 100 includes a number of access points, for example 110a and 110b that communicate with a number of access terminal 120a-120g. For simplicity, only two access points 110a and 110b and only seven access terminals 120a-

120g are shown in FIG. 1. For purpose of discussion, when referring to a single access terminal (AT) 120x is used and when referring to a single access point (AP) 110x will be used (access terminal 120x and access point 110x are described in FIG. 2, infra).

An access point 110, is an electronic device configured to communicate with one or more user access terminals and may also be referred to as a base station, base terminal, fixed terminal, a fixed station, base station controller, a controller, transmitter or some other terminology. The access point, base terminal, and base station are interchangeably used in the description below. The access point 110 may be a general purpose computer, a standard laptop, a fixed terminal, an electronic device configured to transmit, receive and process data according to air interface methods defined by an OFDMA, CDMA, GSM, WCDMA, etc., or an electronic module comprising one or more computer chips controlled by a controller or a processor for transmitting, receiving and processing data according to air interface methods defined by an OFDMA, CDMA, GSM, WCDMA, etc.

An access terminal 120, is an electronic device configured to communicate with the access point via a communication link. The access terminal may also be referred to as a terminal, a user terminal, a remote station, a mobile station, a wireless communication device, recipient terminal, or some other terminology. The access terminal, mobile terminal, user terminal, terminal are interchangeably used in the description below. Each access terminal 120 may communicate with one or multiple access points on the downlink and/or uplink at any given moment. The downlink (i.e., forward link) refers to transmission from the access point to the access terminal 120, and the uplink (i.e., reverse link) refers to transmission from the access terminal 120 to the access point. The access terminal 120 may be any standard laptop, personal electronic organizer or assistant, a mobile phone, cellular phone, an electronic device configured to transmit, receive and process data according to air interface methods defined by an OFDMA, CDMA, GSM, WCDMA, etc. system, or an electronic module comprising one or more computer chips controlled by a controller or a processor for transmitting, receiving and processing data according to air interface methods defined by an OFDMA, CDMA, GSM, WCDMA, etc. system.

A system controller 130 couples to the access points and may further couple to other systems/networks (e.g., a packet data network). System controller 130 provides coordination and control for the access points coupled to it. Via the access points, system controller 130 further controls the routing of data among the terminals, and between the terminals and other users coupled to the other systems/networks.

The techniques described herein for implicit deassignment of one ore more resources may be implemented in various wireless multiple-access multi-carrier communication systems. For example, system 100 may be an OFDMA, CDMA, GSM, WCDMA, etc. system that utilizes data transmission.

For clarity, these techniques are described for an OFDMA system that utilizes orthogonal frequency division multiplexing (OFDM). In this system, a control channel is used assignments to all terminals with the access point 110. In an embodiment, the access point 110 determines if implicit deassignment may be utilized to assign resources to a new terminal and at the same time request deals terminal to deassign its resources. Under certain conditions, such as terminal targeted for the new resources and the terminal targeted for the old resources are within a predefined range, the access point 110 will send only one assignment message instead of and transmitting deassignment to one terminal and a second message for assignment to another terminal.

In an embodiment, a terminal (for example first terminal) demodulates assignment messages intended for all terminals. The first terminal implicitly assumes a deassignment of channels allocated to itself, whenever a in a conflict of assignment is observed by the first terminal. Generally, a conflict arises if the first terminal, having allocated channels, observes an assignment of the allocated channels is observed as being assigned to another terminal.

For example, if a shared channel is used for assignments, a terminal will monitor this channel for conflicting assignments to decide on deassignments. However, it could be common that only a subset of users can successfully demodulate (for example, some users out of range) a particular assignment message. In this case, the network could choose to specifically control the transmission of assignments (varying power, for example) such that terminals that need to be deassigned channels can successfully demodulate the relevant assignment messages that will cause implicit deassignment. In other words, the network would "target" both the old and new holder of the channel with an assignment.

In one embodiment, if a terminal does not observe any deassignment messages or conflicting assignment messages, it assumes that the existing channel assignments persist.

In one embodiment, if a first terminal observes an assignment message to a second terminal that only partially conflicts with the first terminal's channel assignment, the first terminal may assume that the network only intends to deassign the conflicting portion of the channel, and that the network intends for the first terminal to retain the remaining resources as its channel assignment.

In an embodiment, channels may be allocated according to a channel tree, where code, time, or frequency resources can be assigned in a variety of combinations defined by nodes on the tree. In such a case, the tree provides constraints on the simultaneous allocation of channels that can be used to indicate implicit deassignment. If terminal detects a new assignment directed to itself that conflicts with currently held assignments, the terminal may either augment the total resources or expire old resources in favor of the new assignment.

In an embodiment, the access point 110 monitors the location of all the users and determines the power level that is required to insure guarantee of receipt. That is, any message sent to the users within a predetermined range will receive messages. Thus, for those users within the range the ACK/NACK message exchange would not be required. The access point 110 then send a new assignment, without first sending a deassignment message to the targeted users. The users then deassign or terminate use of any resources are in conflict with the current assignment. In other words, automatically interpret the assignment as deassignment of a resource if that currently allocated resource is assigned to another user.

Figure 2:
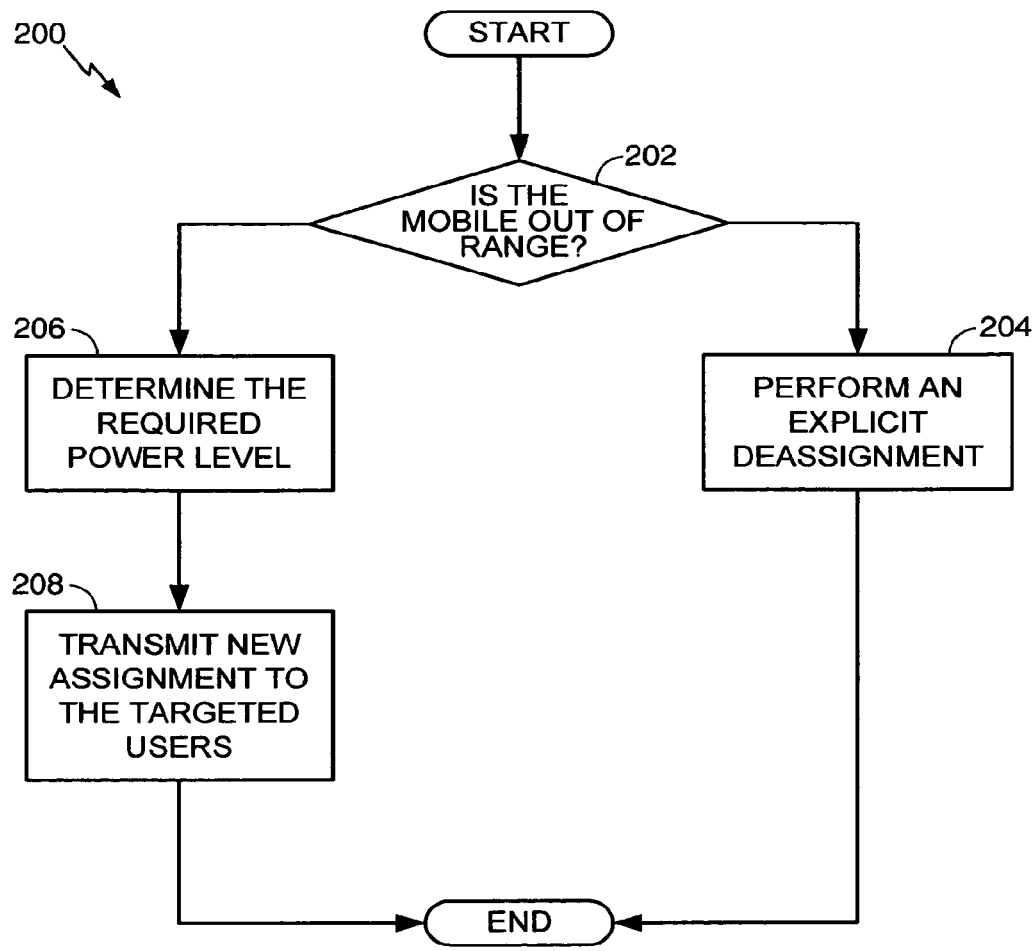
FIG. 2 illustrates a process for implicit deassignment of communication resources.

FIG. 2 illustrates a process 200, for implicit deassignment of communication resources. The AP 110 is configured to execute steps of the process 200 by utilizing at least one of various components described in FIG. 2 for example, the controller 420, the scheduler 430, the memory 422, the TX data processor 414, RX data processor 434, etc. In an embodiment, AP 110 makes a determination if one or more of the assigned resources should first be de-assigned, by transmitting a de-assignment message using a de-assignment of resources, or transmitting a new assignment without sending any deassignment messages. This determination may also be made by the controller 130 and thereafter requests the AP 110 to execute the process 200. At step 202, AP 110 determines whether the access terminal 120 is within a range. The range may be predetermined based statistical analysis, which shows that a message to deassign one or more allocated resource without using explicit deassignment. In an embodiment, a predetermined range is measured by the maximum transmit power allowed by the system. Generally, if the access terminal 120 is within the predetermined range (for example within a few hundred feet), then the access point 110 assumes that any message transmitted to the access terminal 120, will be received. If determined, at step 202, that the access terminal 120 is outside the predetermined range, then at step 204, the access point 110 performs an explicit deassingment.

However, if determined, at step 202, that the access terminal 120 is within the predetermined range, then at step 206, the access point 110 determines the required or appropriate transmission power to insure that the access terminal 120 will receive the new assignment information. At step 208, using appropriate power, the access point 110 transmits a new assignment of a resource to one or more access terminals.

The new assignment information is transmitted to all the users within the predetermined range. Thus, if new the assignment received by the access terminal (for example first access terminal) indicates that the resource is now assigned to another access terminal, then an assignment conflict occurs. This conflict indicates to the recipient of the new assignment message, that one or more of its allocated resources is now allocated to another user, for example second access terminal. The access point 110 after a predetermine time begins transmitting information using new resource assignment, thus the access point 110 implicitly deassigned the resource.

Figure 3:
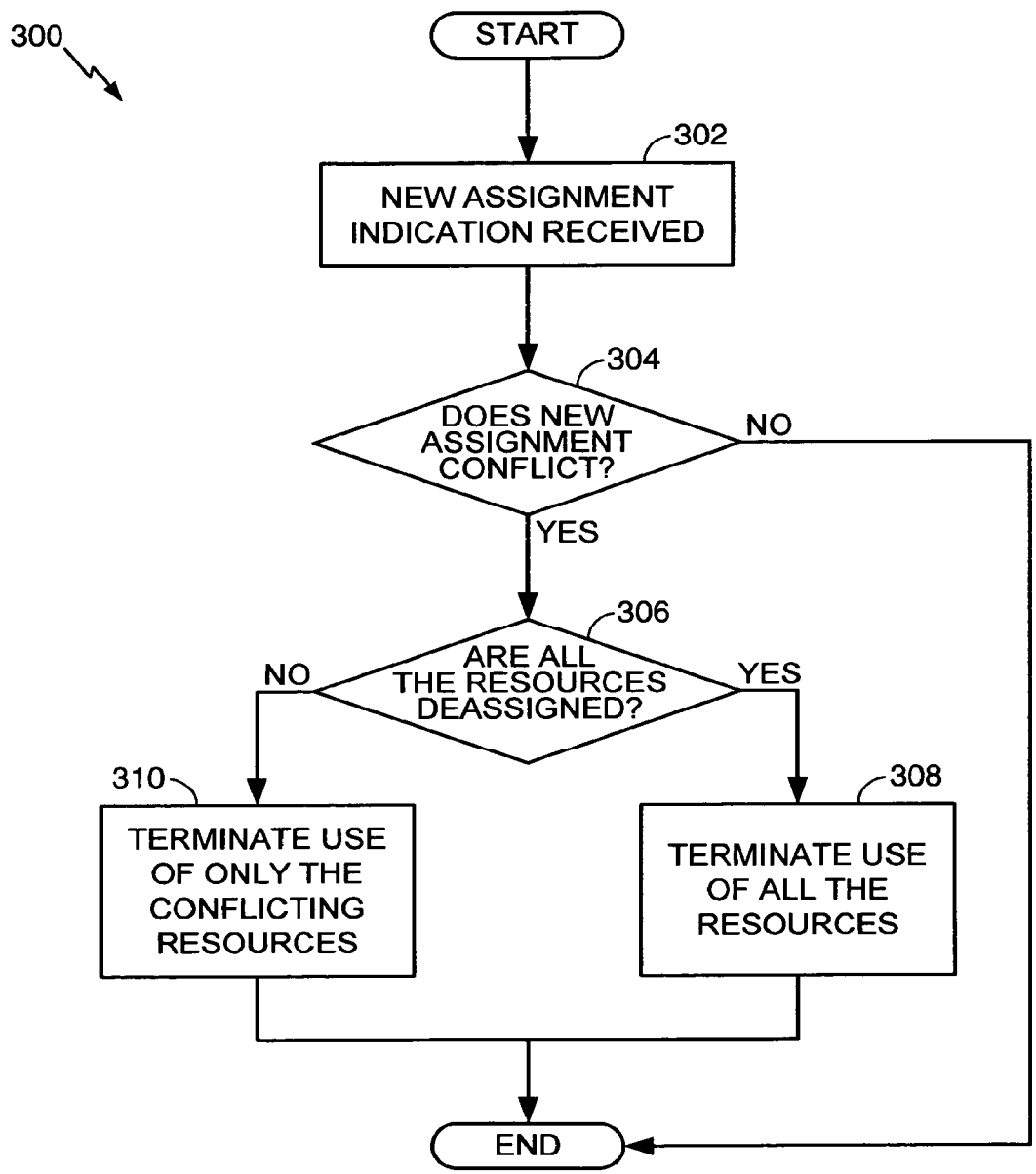
FIG. 3 shows a process of handling assignment information received on an assignment channel.

FIG. 3 shows a process 300 of handling assignment information received on an assignment channel, for example a Shared Signaling Channel (SSCH). The access terminal 120 is configured to execute steps of the process 300 by utilizing at least one of various components described in FIG. 2 for example, the controller 460, the memory 462, the TX data processor 474, RX data processor 456, etc. At step 302, the access terminal 120 receives a new assignment indication from the access point 110. At step 304, the access terminal 120 determines if the new assignment conflicts with current assignment. If at step 304, a conflict does occur, then step 306 is executed. At step 306, the access terminal 120 determines if all the assigned resources are deassigned. If determined that all the allocated resources are reassigned to another user, then at step 308, the access terminal 120 will terminate use of all allocated resources. Otherwise at step 310, the access terminal 120 terminates only the conflicting resources and continues to utilize the resources that were not conflicted by the new assignment.

Figure 4:
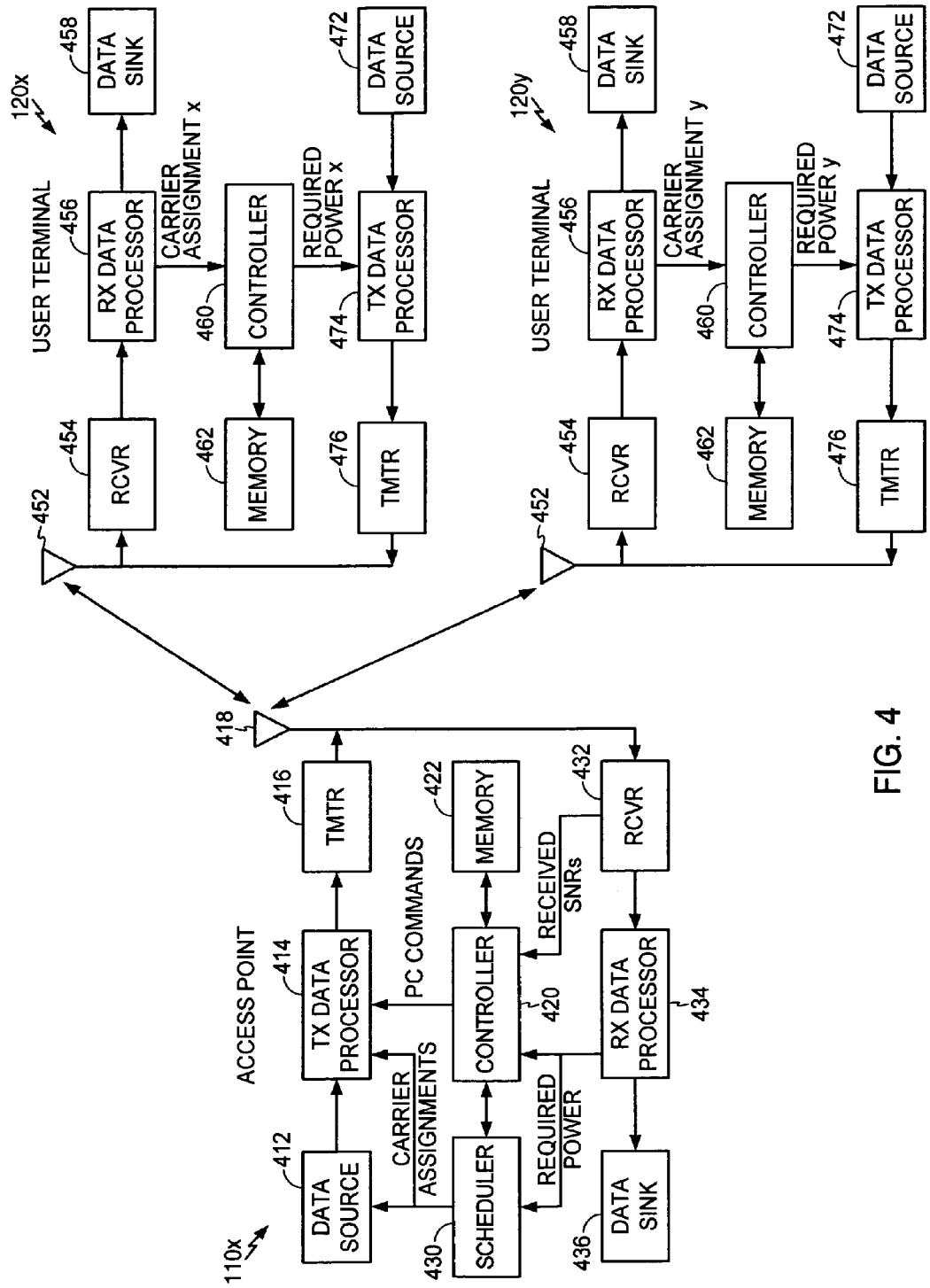
FIG. 4 a block diagram of a communication system.

FIG. 4 shows a block diagram of an embodiment of an access point 110x and two terminals 120x and 120y in multiple-access multi-carrier communication system 100. At access point 110x, a transmit (TX) data processor 414 receives traffic data (i.e., information bits) from a data source 412 and signaling and other information from a controller 420 and a scheduler 430. For example, controller 420 may provide power control (PC) commands that are used to adjust the transmit power of the active terminals, and scheduler 430 may provide assignments of carriers for the terminals. These various types of data may be sent on different transport channels. TX data processor 414 encodes and modulates the received data using multi-carrier modulation (e.g., OFDM) to provide modulated data (e.g., OFDM symbols). A transmitter unit (TMTR) 416 then processes the modulated data to generate a downlink modulated signal that is then transmitted from an antenna 418.

At each of terminals 120x and 120y, the transmitted and modulated signal is received by an antenna 452 and provided to a receiver unit (RCVR) 454. Receiver unit 454 processes and digitizes the received signal to provide samples. A received (RX) data processor 456 then demodulates and decodes the samples to provide decoded data, which may include recovered traffic data, messages, signaling, and so on. The traffic data may be provided to a data sink 458, and the carrier assignment and PC commands sent for the terminal are provided to a controller 460.

Controller 460 directs data transmission on the uplink using the specific carriers that have been assigned to the terminal and indicated in the received carrier assignment. Controller 460 further adjusts the transmit power used for the uplink transmissions based on the received PC commands.

For each active terminal 120, a TX data processor 474 receives traffic data from a data source 472 and signaling and other information from controller 460. The various types of data are coded and modulated by TX data processor 474 using the assigned carriers and further processed by a transmitter unit 476 to generate an uplink modulated signal that is then transmitted from antenna 452.

At access point 110x, the transmitted and modulated signals from the terminals are received by antenna 418, processed by a receiver unit 432, and demodulated and decoded by an RX data processor 434. Receiver unit 432 may estimate the received signal quality (e.g., the received signal-to-noise ratio (SNR)) for each terminal and provide this information to controller 420. Controller 420 may then derive the PC commands for each terminal such that the received signal quality for the terminal is maintained within an acceptable range. RX data processor 434 provides the recovered feedback information (e.g., the required transmit power) for each terminal to controller 420 and scheduler 430.

Scheduler 430 uses the feedback information to perform a number of functions such as (1) selecting a set of terminals for data transmission on the reverse link and (2) assigning carriers to the selected terminals. The carrier assignments for the scheduled terminals are then transmitted on the forward link to these terminals.

The techniques described herein may be implemented by various means. For example, these techniques may be implemented in hardware, software, or a combination thereof. For a hardware implementation, the processing units (e.g., controllers 420 and 470, TX and RX processors 414 and 434, and so on) for these techniques may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

For a software implementation, the techniques described herein may be implemented with modules (e.g., procedures, functions, and so on) that perform the functions described herein. The software codes may be stored in memory units (e.g., memory 422 in FIG. 4) and executed by processors (e.g., controllers 420). The memory unit may be implemented within the processor or external to the processor, in which case it can be communicatively coupled to the processor via various means as is known in the art.

Headings are included herein for reference and to aid in locating certain sections. These headings are not intended to limit the scope of the concepts described therein under, and these concepts may have applicability in other sections throughout the entire specification.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method of processing an assignment of one or more communication resource, the method comprising acts of:
   receiving an assignment indication having an assignment of one or more newly assigned communication resource intended for a second access terminal;
   determining that a conflict occurs between the one or more newly assigned communication resource intended for the second access terminal and one or more currently assigned communication resource for a first access terminal;
   interpreting the conflict as an implied de-assignment of the one or more currently assigned communication resource for the first access terminal; and
   terminating the use of said one or more currently assigned communication resource for the first access terminal in response to interpreting the conflict as the implied deassignment.

2. The method as claimed in claim 1, wherein the act of determining comprises an act of determining that said assignment indication indicates that the currently assigned communication resources for the first access terminal are assigned to the second access terminal.

3. The method as claimed in claim 1, wherein said act of terminating said one or more currently assigned communication resource for the first access terminal comprises an act of terminating use of only said one or more communication resources for the first access terminal that are in conflict with the newly assigned communication resource intended for the second access terminal.

4. The method as claimed in claim 1, wherein said act of terminating said one or more currently assigned communication resource for the first access terminal comprises an act of terminating use of all said one or more currently assigned communication resources for the first access terminal.

5. The method as claimed in claim 1, wherein the said act of receiving further comprising act of receiving in accordance with a Code Division Multiplex Access (CDMA) scheme.

6. The method as claimed in claim 1, wherein the said act of receiving further comprising act of receiving in accordance with an Orthogonal Frequency Division Multiplex (OFDM) scheme.

7. The method as claimed in claim 1, wherein said act of receiving further comprising act of receiving in accordance with an Orthogonal Frequency Division Multiple Access (OFDMA) scheme.

8. An apparatus for processing an assignment of one or more communication resource, the apparatus comprising:
   means for receiving an assignment indication having an assignment of one or more newly assigned communication resource intended for a second access terminal;
   means for determining that a conflict occurs, between the one or more newly assigned communication resource intended for the second access terminal and one or more currently assigned communication resource for a first access terminal;
   means for interpreting the conflict as an implied de-assignment of the one or more currently assigned communication resource for the first access terminal; and
   means for terminating the use of said one or more currently assigned communication resource for the first access terminal in response to interpreting the conflict as the implied deassignment.

9. The apparatus as claimed in claim 8, wherein the means for determining comprises means for determining that said assignment indication indicates that the currently assigned communication resources for the first access terminal are assigned to the second access terminal.

10. The apparatus as claimed in claim 8, wherein said means for terminating said one or more currently assigned communication resource for the first access terminal comprises means for terminating use of only said one or more communication resources for the first access terminal that are in conflict with the newly assigned communication resource intended for the second access terminal.

11. The apparatus as claimed in claim 8, wherein said means for terminating said one or more currently assigned communication resource for the first access terminal comprises means for terminating use of all said one or more currently assigned communication resources for the first access terminal.

12. The apparatus as claimed in claim 8, wherein the said means for receiving further comprising means for receiving in accordance with a Code Division Multiplex Access (CDMA) scheme.

13. The apparatus as claimed in claim 8, wherein the said means for receiving further comprising means for receiving in accordance with an Orthogonal Frequency Division Multiplex (OFDM) scheme.

14. The apparatus as claimed in claim 9, wherein said means for receiving further comprising means for receiving in accordance with an Orthogonal Frequency Division Multiple Access (OFDMA) scheme.

15. In a wireless communication, an apparatus comprising:
   an electronic device, said electronic device configured to:
      receive an assignment indication having an assignment of one or more newly assigned communication resource intended for a second access terminal;
      determine that a conflict occurs between the one or more newly assigned communication resource intended for the second access terminal and one or more currently assigned communication resource for a first access terminal;
      interpret the conflict as an implied de-assignment of the one or more currently assigned communication resource for the first access terminal; and
      terminate the use of said one or more currently assigned communication resource for the first access terminal in response to interpreting the conflict as the implied deassignment.

16. The apparatus as claimed in claim 15, wherein said electronic device further configured to determine that said assignment indication indicates that the currently assigned communication resources for the first access terminal are assigned to the second access terminal.

17. The apparatus as claimed in claim 15, wherein said electronic device further configured to terminate use of only said one or more communication resources for the first access terminal that are in conflict with the newly assigned communication resource intended for the second access terminal.

18. The apparatus as claimed in claim 15, wherein said electronic device further configured to terminate use of all said one or more currently assigned communication resources for the first access terminal.

19. The apparatus as claimed in claim 15, wherein said electronic device further configured to receive in accordance with a Code Division Multiplex Access (CDMA) scheme.

20. The apparatus as claimed in claim 15, wherein said electronic device further configured to receive in accordance with an Orthogonal Frequency Division Multiplex (OFDM) scheme.

21. The apparatus as claimed in claim 15, wherein said electronic device further configured to receive in accordance with an Orthogonal Frequency Division Multiple Access (OFDMA) scheme.

22. A machine-readable medium comprising instructions which, when executed by a machine, cause the machine to perform operations including:
   receiving an assignment indication having an assignment of one or more newly assigned communication resource intended for a second access terminal;
   determining that a conflict occurs between the one or more newly assigned communication resource intended for the second access terminal and one or more currently assigned communication resource for a first access terminal;
   interpreting the conflict as an implied de-assignment of the one or more currently assigned communication resource for the first access terminal; and
   terminating the use of said one or more currently assigned communication resource for the first access terminal in response to interpreting the conflict as the implied deassignment.

23. The machine-readable medium as claimed in claim 22, wherein the machine readable instruction to cause determining comprises determining that said assignment indication indicates that the currently assigned communication resources for the first access terminal are assigned to the second access terminal.

24. The machine-readable medium as claimed in claim 22, wherein said machine readable instruction to cause terminating said one or more currently assigned communication resource for the first access terminal comprises terminating use of only said one or more resources that are in conflict with the received assignment of resource.

25. The machine-readable medium as claimed in claim 22, wherein said machine readable instruction to cause terminating said one or more currently assigned communication resource comprises terminating use of all said one or more currently assigned communication resources for the first access terminal.

* * * * *